Dec. 16, 1947.  C. S. ASH  2,432,708
VEHICLE AXLE
Original Filed Sept. 24, 1943   2 Sheets-Sheet 1
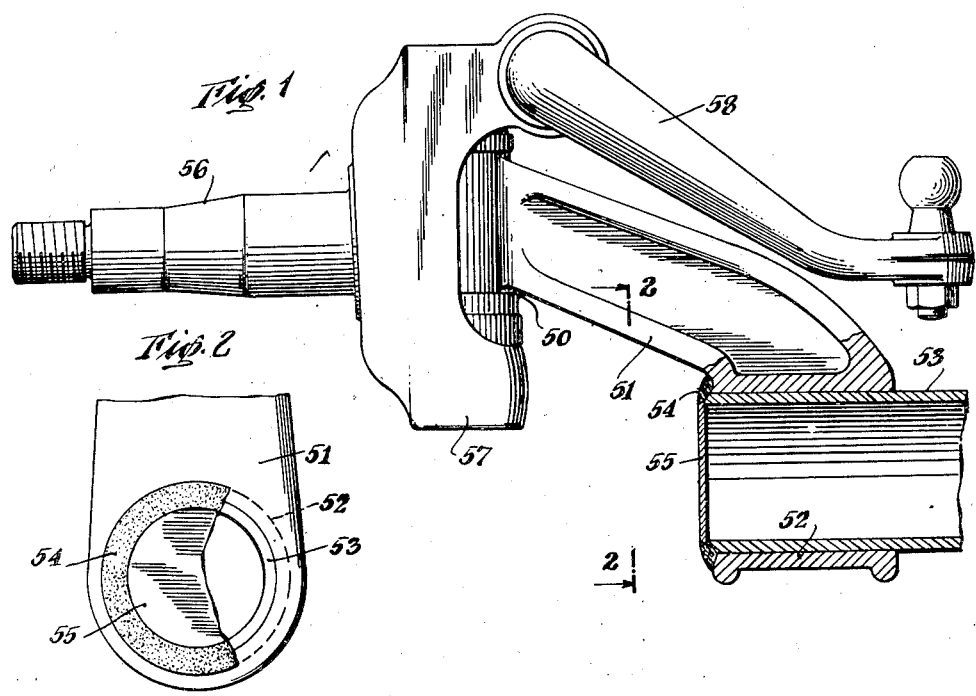
INVENTOR
BY  Charles S. Ash
ATTORNEY Dec. 16, 1947.  C. S. ASH  2,432,708
VEHICLE AXLE
Original Filed Sept. 24, 1943   2 Sheets-Sheet 2
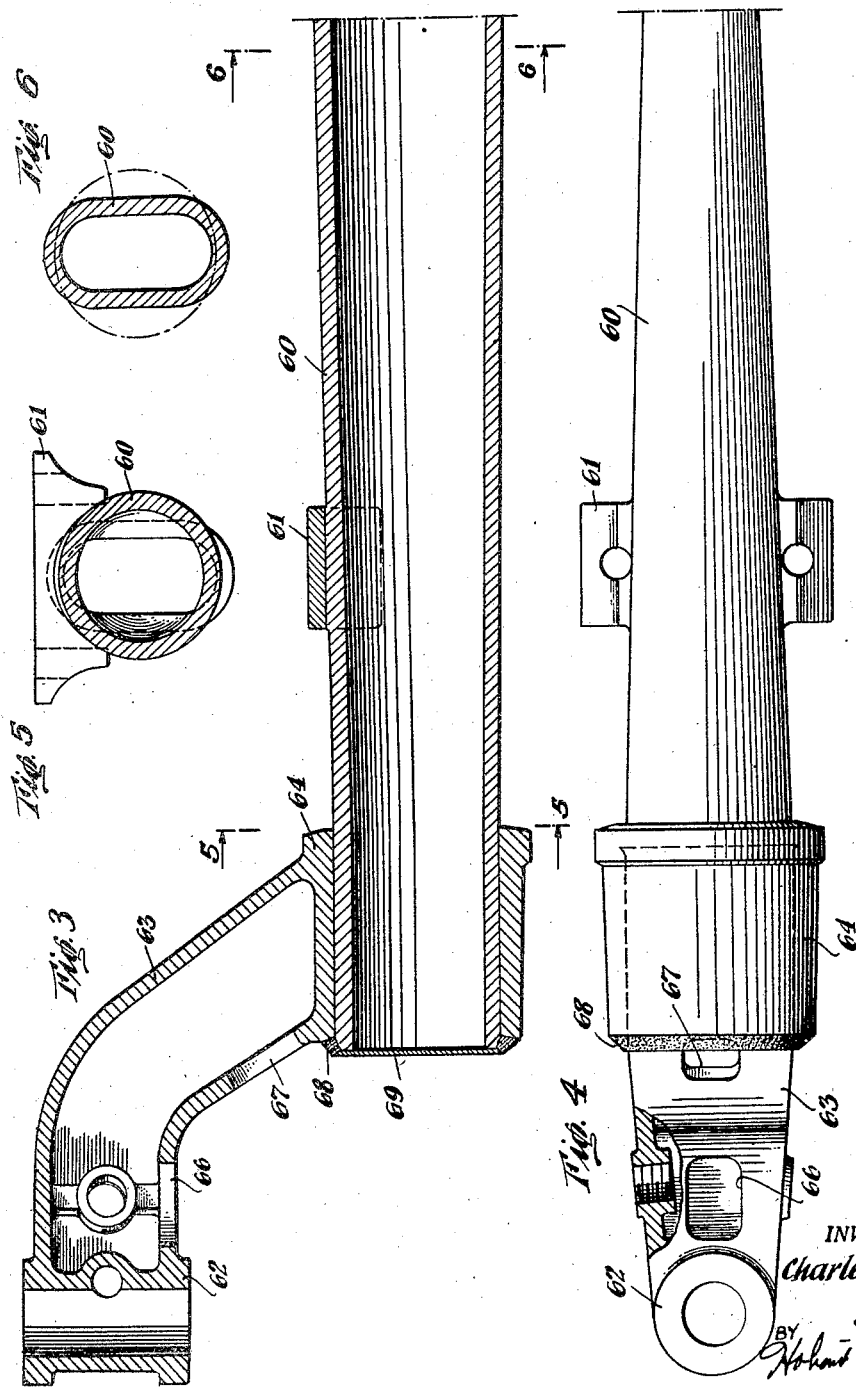
INVENTOR.
Charles S. Ash
BY
ATTORNEY Patented Dec. 16, 1947

2,432,708

UNITED STATES PATENT OFFICE 2,432,708

VEHICLE AXLE

Charles S. Ash, Milford, Mich.

Original application September 24, 1943, Serial No. 503,608. Divided and this application April 19, 1945, Serial No. 589,161

2 Claims. (Cl. 280—96.1)

The present invention relates to vehicle axles, and more particularly to axles for the front or steering end of vehicles.

Objects and advantages of the invention will be set forth in part hereinafter and in part will be obvious herefrom or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate an embodiment of the invention, and together with the description, serve to explain the principles of the invention.

Of the drawings:

Fig. 1 is a side elevation of a front or steering axle assembly of an embodiment of the present invention, certain parts being shown in vertical cross-section;

Fig. 2 is an end elevation of the axle assembly shown in Fig. 1 taken along line 2—2 of Fig. 1, certain parts being broken away for greater clarity;

Fig. 3 is a vertical longitudinal cross-sectional view of another front or steering axle embodying the present invention;

Fig. 4 is a plan view of the axle shown in Fig. 3;

Fig. 5 is a cross-sectional view taken along line 5—5 of Fig. 3; and

Fig. 6 is a cross-sectional view taken along line 6—6 of Fig. 3.

It is an object of the present invention to provide a front or steering vehicle axle assembly which is lighter and stronger than conventional axle assemblies and which is more economical and simpler to build. Another object of the invention is to provide such an axle assembly which may be built with a minimum of special tooling equipment. The invention further provides a front or steering axle construction of a design more flexible as to specifications than conventional axles.

This application is a division of my co-pending application, Serial No. 503,608, which was filed September 24, 1943, now Patent No. 2,389,712, November 27, 1945.

Referring now in detail to the illustrative embodiments of the present invention as shown by way of example in the accompanying drawings, and referring to Figs. 1 to 6 inclusive, Figs. 1 and 2 of the drawings show an illustrative embodiment of the present invention wherein the steering knuckle or king pin holding member 50 is made integral with an arm member 51 as a part of the same drop forging or steel casting. The arm 51 is provided with a cylindrical collar member 52 integral therewith at its end to be fitted over the end of a tubular axle or beam member 53. In assembling the cylindrical collar is heated and pressed upon the axle 53 far enough to leave a small extent of the axle 53 protruding from the outer end of cylindrical collar 52. The cylindrical collar is thereafter shrunk into place, and a circular weld line 54 applied at the outer end on a radially outer surface of the axle portion protruding beyond the collar. A circular cap 55 is welded into place over the end of the tubular axle 53 by the same circular weld 54 and at the same time.

Other conventional parts such as the spindle 56, yoke arms 57, and steering arm 58 complete the embodiment as shown in Fig. 1.

In the embodiment of the invention as herein shown and described it is apparent that a minimum number of parts are required for a steering knuckle assembly at the end of a tubular axle, and that the parts are of relatively simple design and may be economically made. It may further be seen that the axle and knuckle assembly is made with welding at the end of the tubular axle only, and there are no welds required intermediate the ends to weaken the axle construction. The king pin holding member 50, arm member 51 and collar member 52 constitute a single, integral element providing a knuckle unit which is readily mounted on the end of the beam member 53.

In the axle and steering knuckle assembly shown in Figs. 3 to 6 inclusive there is provided an axle or beam member 60 having an oval cross section as shown in Fig. 6, throughout its central portion merging into a substantially circular cross section at the ends of the axle, as seen in Fig. 5. Saddle members 61 are provided adjacent the cylindrical ends of the axle as a support for suitable spring assemblies. At the ends of the beam member 60 there are provided the king pin holding members or steering knuckles 62 for any suitable spindle, yoke and king pin assemblies for dirigibly mounting vehicle wheels.

The knuckle 62 is formed integrally with a downwardly turned box-like arm member 63 terminating at its lower end in an integral cylindrical collar member 64. The knuckle, arm and collar may be formed in a single casting and openings 66 and 67 provided at the underside of the arm to remove the core. In assembling the beam member and steering knuckle unit the cylindrical collar 64 is heated and pressed onto the cylindrical end of axle 60 and thereafter shrunk into position. The cylindrical collar is pressed inwardly on the axle so as to uncover a small extent of the axle end, and a circular weld 68 applied to a radially outer surface of the axle portion protruding beyond the collar to securely hold the knuckle unit casting on the axle. A circular cover plate 69 may be positioned over the end of the axle and securely welded thereto by the same welding 68.

The knuckle and arm assembly of the present embodiment will be found particularly adaptable to heavy duty vehicle construction where great strength is required in the construction and strains from braking torque are particularly great. The arm construction provides a compact and extremely sturdy knuckle supporting member. The axle member 60 is likewise designed to provide a maximum strength with a minimum of material and bulk, the oval central portion being much stronger in the vertical plane than conventionally formed tubular axles. A smaller diameter tubing for the necessary strength may be used in making the axle, which provides an advantage of economy together with the other advantages of the invention.

The invention in its broader aspects is not limited to the specific mechanisms shown and described but departures may be made therefrom within the scope of the accompanying claims without departing from the principles of the invention and without sacrificing its chief advantages.

What I claim is:

1. A steering vehicle axle unit comprising a tubular beam member and a knuckle unit at the end of said member, said knuckle unit comprising a collar member encircling an end of the beam member, said beam member having a portion protruding through said collar member, a curved arm integral with said collar member and extending from an upper surface thereof upwardly and outwardly with respect to the end of the beam member, a king pin holding member at the end of said arm and integral therewith, and a plate member over the end of said beam member, said plate member and collar member being secured to said beam member by the same curved line of welding at the end of said beam member on the radially outer surface of said protruding portion.

2. A steering vehicle axle unit comprising a tubular beam member and a knuckle unit at the end of said member, said knuckle unit comprising a collar member encircling an end of the beam member, said beam member having a portion protruding through said collar member, a curved, hollow, box-like arm integral with said collar member and extending from an upper surface thereof upwardly and outwardly with respect to the end of the beam member, a king pin holding member at the end of said arm and integral therewith, and a plate member over the end of said beam member, said plate member and collar member being secured to said beam member by the same curved line of welding at the end of said beam member on the radially outer surface of said protruding portion.

CHARLES S. ASH.

REFERENCES CITED

The following references are of record in the file of this patent:

UNITED STATES PATENTS

| Number | Name | Date |
|---|---|---|
| 1,384,309 | Druar | July 12, 1921 |
| 1,476,328 | Duesenberg | Dec. 4, 1923 |
| 1,628,967 | Goode | May 17, 1927 |
| 1,488,128 | Macdonald | Mar. 25, 1924 |
| 1,931,105 | Crawford et al. | Oct. 17, 1933 |